July 26, 1932. H. H. BERRYMAN 1,868,965
TRANSMISSION CLUTCH
Filed March 20, 1931 2 Sheets-Sheet 1

Inventor:
Harry H. Berryman,
By Fleming & Fleming
Attys.

July 26, 1932.　　H. H. BERRYMAN　　1,868,965
TRANSMISSION CLUTCH
Filed March 20, 1931　　2 Sheets-Sheet 2
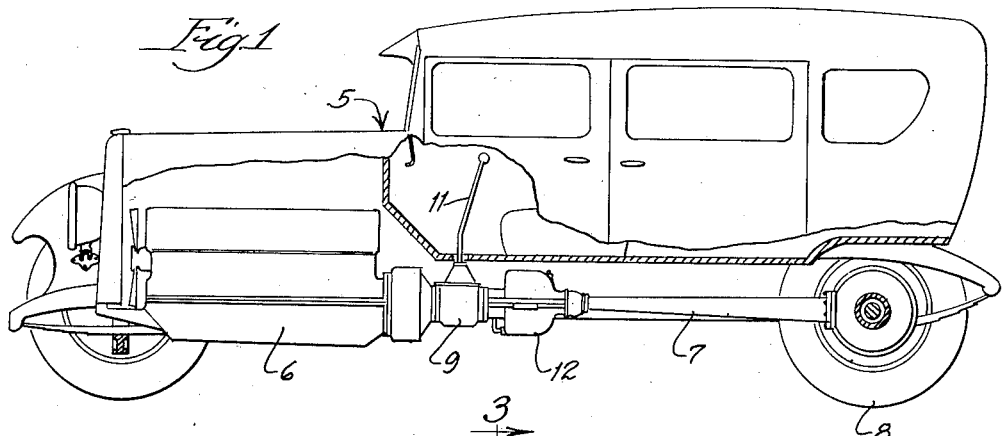
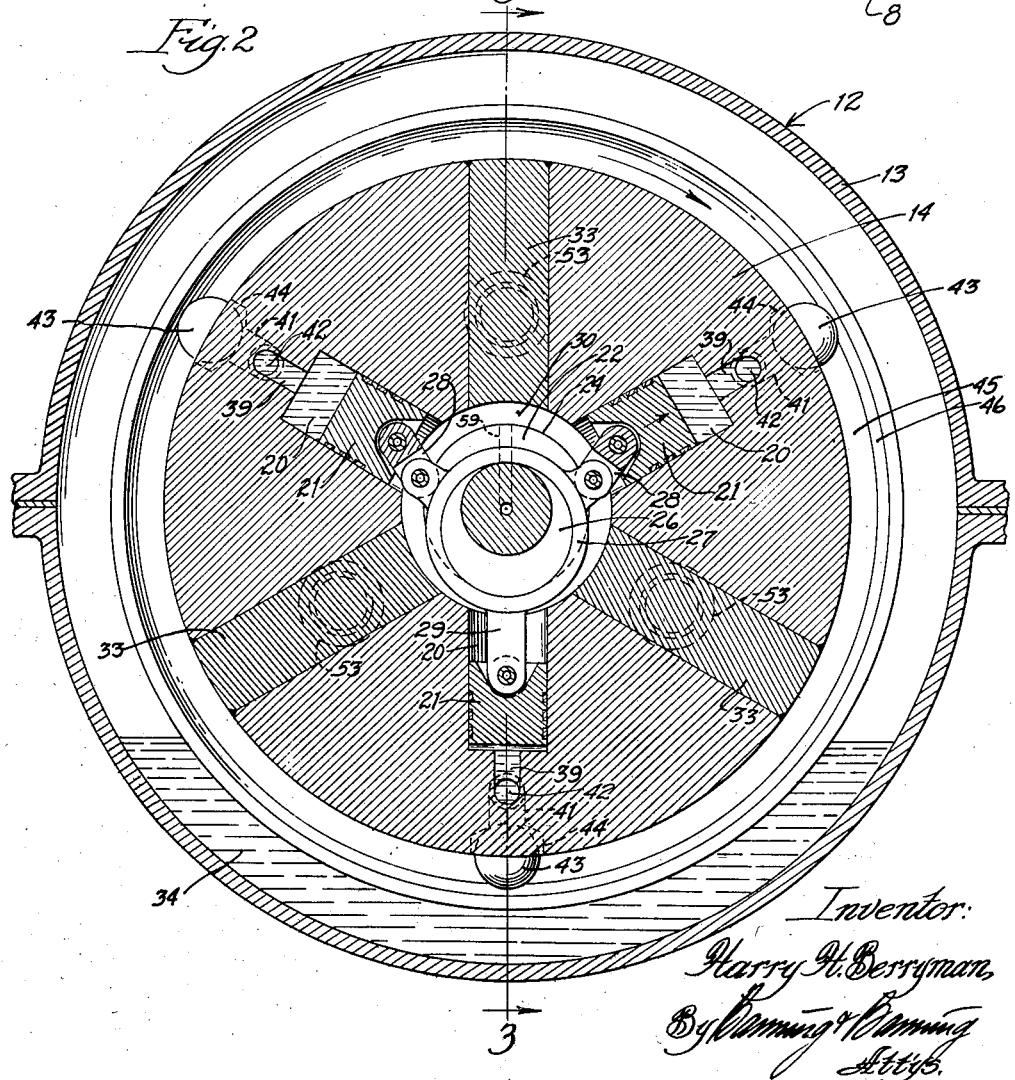
Inventor:
Harry H. Berryman,
By Cumming & Cumming
Attys.

Patented July 26, 1932

1,868,965

UNITED STATES PATENT OFFICE

HARRY H. BERRYMAN, OF ELMHURST, ILLINOIS

TRANSMISSION CLUTCH

Application filed March 20, 1931. Serial No. 523,964.

This invention relates to transmission clutches, and its principal object is to provide automatic means controlled by the speed of a drive shaft for obtaining a variable speed for a driven shaft. It is well known that considerable power is required to overcome the inertia of a motionless vehicle in starting the same, and the clutch embodying the present invention has been designed to transmit the power from a drive shaft to a driven one and to start and automatically increase the speed of a driven shaft gradually to a relatively high speed, whereby the usual gear shift mechanism for accomplishing this result is eliminated.

Another object is to provide variable speed power transmission mechanism capable of automatically increasing the speed of a driven shaft both in a forward and reverse direction, which mechanism is entirely automatic and is controlled by the speed of the drive shaft. Another object is to provide hydraulic means between a drive and driven shaft capable of automatically effecting a gradual increase in the speed of the driven shaft.

With these and other objects and advantages in view, this invention consists in a transmission clutch embodying hydraulic means in the connections between a drive and driven shaft and operating to automatically connect the driven shaft with the drive shaft and gradually increase the speed of the driven shaft relative to the speed of the drive shaft up to the point where the drive and driven shafts rotate at the same speed.

The invention further consists in a transmission clutch embodying hydraulic means for connecting a drive shaft with a driven shaft constructed and arranged to permit independent rotation of the drive shaft and to automatically start and speed up the driven shaft to the same speed as the drive shaft and controlled by the speed of the drive shaft. The invention further consists in means actuated by the driven shaft for maintaining a positive connection between the drive and driven shafts, whereby they rotate at equal speed.

It further consists in the several novel features of construction, arrangement and combination of parts hereinafter fully set forth and claimed.

An embodiment of the invention is clearly illustrated in the drawings accompanying this specification in which—

Figure 1 is a view partly in side elevation and partly in vertical longitudinal section of an automobile equipped with a transmission clutch embodying a simple form of the present invention;

Fig. 2 is a detail vertical cross section of the clutch taken on the line 2—2 of Fig. 3.

Figure 3:
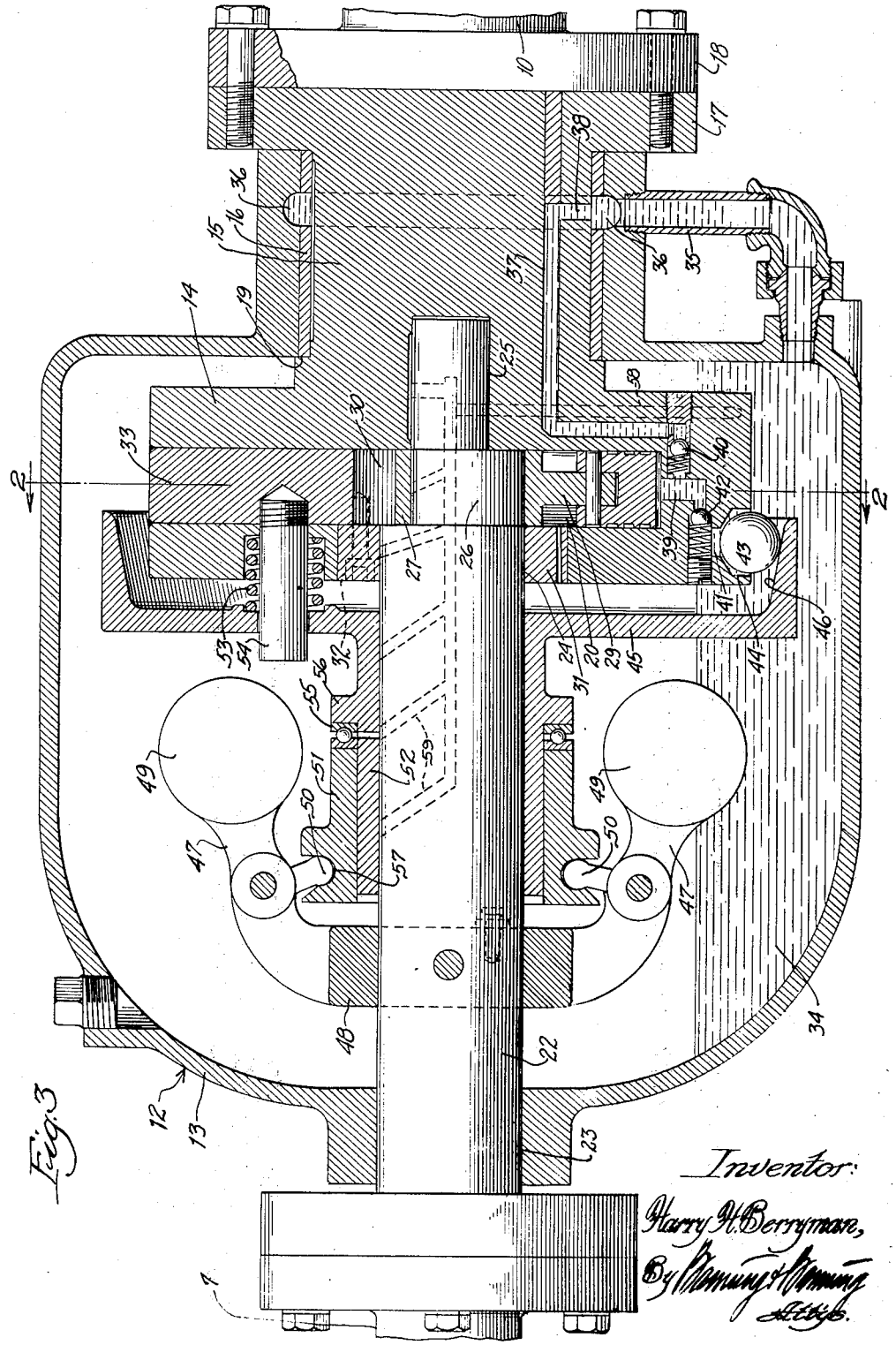
Fig. 3 is a central longitudinal section taken on the line 3—3 of Fig. 2.

Referring to said drawings which illustrate a simple embodiment of the invention, the reference character 5 designates an automobile of conventional form provided with the usual motor 6 and propeller shaft 7 which drives the wheels 8 through the usual differential gearing, as is well understood. Gear shift mechanism 9 containing forward, reverse and neutral positions is provided in connection with the motor shaft for coupling the motor shaft with a drive or power shaft 10 (see Fig. 3) so as to drive the same in forward and reverse directions. The gear shift mechanism has a lever 11, whereby the gear shift is actuated from neutral to forward or reverse rotation of the drive shaft.

Interposed between the drive shaft 10 and the propeller shaft 7 is the transmission clutch 12 which forms the subject matter of this specification. The clutch mechanism is contained in a case 13, conveniently formed of upper and lower sections bolted together and bolted to and supported by the chassis of the automobile.

Bolted or otherwise rigidly secured to the drive shaft 10 is a head 14 formed with a hub portion 15 which is journaled in a bearing 16 carried by the case 13. The outer end of the hub may be flanged, as seen at 17, for connection with the flange 18 of the drive shaft 10. The head 14 is held against endwise movement by a shoulder 19 at one end of the hub 15 and by the flange 17 which bear against the bearing 16.

The head 14, comprises the pump body of certain liquid pumping mechanism, and is bored radially at a plurality of equi-distant places to form cylinders 20 in which are pistons 21 that are reciprocated in the cylinders as a result of differential movement between the drive shaft and the propeller shaft 7. The driven shaft 22 of the transmission clutch is mounted in co-axial alignment with the drive shaft and is connected as usual with the propeller shaft 7. The driven shaft 22 is journaled in a bearing 23 carried by the case 13 and is also journaled in bearing apertures in the head 14 as at 24 and 25.

On the end of the driven shaft contained in the head 14 is an eccentric block 26 preferably turned down from the shaft proper, and, as a preference, the end portion of the shaft which projects from the eccentric block is reduced in diameter, as shown, and bears in the bearing aperture 25. Surrounding the eccentric block is an eccentric strap 27 which is connected to the pistons 21 by links 28 and 29, whereby the rotary movement of the eccentric strap about the eccentric block is translated into reciprocatory movements of the pistons. The links 28 have jointed connections with the eccentric strap, whereas the link 29 is rigid therewith, as seen in Fig. 2. The purpose of this is to permit of the eccentric movement of the strap about the eccentric block.

The eccentric block and strap are contained in a cavity 30 centrally located in the head 14, and an enlarged opening is provided for access to the cavity 30 to permit of the insertion of the eccentric strap therein. The opening is closed by a ring 31 secured to the head in any suitable manner, as, for instance, by screws 32, and said ring also provides the bearing 24 for the driven shaft 22. The cylinders 20 are formed by boring into the head from the side diametrically opposite the cylinders and thereafter plugging up the portions of the bores opposite the cylinders with plugs 33.

The mechanism just described provides means for building up pressure in the cylinders or cylinder bores 20 whenever the drive shaft is rotated at a greater speed than an idling speed, and the pressure is utilized to couple the drive shaft with the driven shaft in such manner that the speed of rotation of the driven shaft is gradually increased to a speed equal to or substantially equal to that of the drive shaft. A liquid 34, such as oil or the like, is used in connection with the pistons and cylinders for building up the pressure, and said liquid is contained in the lower section of the casing 13 which acts as a reservoir for the liquid.

A conduit 35 leads from the reservoir to an annular conduit 36 formed in the bearing member 16, and from said annular conduit lead individual conduits 37 which run to the cylinders 20, there being one conduit 37 for each cylinder, and having an inlet port 38 which opens to the annular conduit 36 and a port 39 which opens to the associated cylinder. Between each conduit 37 and the associated port 39 is a check valve 40 opening towards the cylinder through which the oil or other liquid is drawn into the associated cylinder during the suction stroke of the piston.

Each port 39 also forms part of a discharge passage 41 which leads back into the reservoir, and said discharge passage is controlled by a check valve 42 which opens outwardly from the cylinder. The discharge passage 41 has a restricted discharge opening, whereby the escape of the liquid from the cylinder is restricted, and said restricted discharge opening is controlled by a ball or other valve 43 normally positioned close to the discharge port so as to form the restricted orifice. A ball valve 43 is shown, and said valve is partly contained in a recess 44, the bottom of which provides a valve seat around the discharge orifice. The means illustrated for holding the ball valves in position adjacent the discharge orifices comprises a flanged disk or plate 45 mounted upon the driven shaft and having a tapered or inclined face 46 upon which the ball valves 43 rest and which also acts in the operation of the device to seat the ball valves over the restricted discharge orifices.

The cylinders, pistons and check valves operate in the nature of liquid pumps, and the parts are so proportioned and arranged that when the drive shaft 10 is driven at a relatively low speed, as, for instance, when the motor is idling, the several pumps circulate the liquid from the reservoir through the conduits back to the reservoir through the restricted discharge orifices. So long as the liquid is free to be discharged from the cylinders without producing any appreciable pressure therein, the driven shaft 22 remains stationary and the head 14 of the drive shaft rotates idly thereabout, carrying the pistons around the axis of the drive shaft and causing the eccentric strap 27 to run idly around the eccentric block 26.

When, however, the speed of the drive shaft is accelerated, the pistons are reciprocated at greater rapidity, and, as a result, considerable pressure is built up in the cylinders during the outward strokes of the pistons due to the fact that the liquid as it is being forced out of the cylinders is unable to escape fast enough through the restricted orifices. Pressure thus being built up in the cylinders, the pumping action of the pistons is retarded to a greater degree, and, as a result, the outward thrust of the pistons is slowed up, the effect of which is to bodily rotate the eccentric strap and therewith the eccentric block about the axis of the drive and driven shafts in addition to moving the eccentric strap around the axis of the eccentric block, thereby causing the driven shaft to be slowly rotated. By still further accelerating the speed of the drive shaft, the resistance to the movement of the pistons is increased to the point where the pistons are practically incapable of any reciprocatory movements in the cylinders, and, as a result, the rotating head 14 is clutched to the driven shaft 22 through the liquid in the cylinders, the pistons, the eccentric strap and block.

Means are provided for entirely closing the discharge orifices 41 so as to prevent the escape of any of the liquid from the cylinders 20, whereby the drive and driven shafts will be positively coupled together so as to rotate in unison, and said means is controlled by the speed of the driven shaft. Said means may take the form of a governor carried by the driven shaft and operating to move the disk 45 in a direction to seat the valves 43.

In the form of the invention illustrated, a pair of weighted bell crank arms 47 are fulcrumed upon a collar 48 pinned or otherwise secured to the driven shaft 22, and said bell crank levers 47 are provided with balls or other weights 49 upon their free ends and with arms 50 that engage with a collar 51 which is rotatably mounted upon a hub portion 52 of the disk 45. The disk 45 is urged in a direction to unseat the ball valves 43, and, for this purpose, coiled compression springs 53 are employed between the disk 45 and the head 14, the action of said springs serving also to move the weighted ends of the bell crank levers 47 towards the shaft.

As a preference, the disk 45 is connected to the head 14 for rotation therewith, and, for this purpose, driving pins 54 are provided which are secured in the head and project through openings in the disk 45. An anti-friction thrust bearing 55 is provided between the collar 51 and an annular shoulder 56 on the hub 52 of the disk 45 and an annular groove 57 is formed in the collar for the reception of the arms 50 of the bell crank levers 47.

In the operation of the clutch, whenever the speed of the driven shaft has been increased to a speed substantially equal to that of the drive shaft, the weighted ends of the bell crank levers 47 are thrown outward by centrifugal action, and, as a result, the collar 51 and therewith the disk 45 are moved towards the right, as viewed in Fig. 3, the tapered face 46 of said disk acting to force the valves 43 upon their seats, thereby entirely closing the restricted orifices, preventing any of the liquid from escaping from the cylinders 20, and stopping the reciprocatory movement of the pistons, thereby in effect locking the drive shaft with the driven shaft.

Suitable oil ducts and grooves 58 and 59 are provided for conducting oil from the reservoir to the various bearing surfaces for the purpose of lubricating the several bearings of the clutch.

It is to be understood that the gear shift mechanism 9 may be omitted in situations where the driven shaft is always driven in a forward direction, as, for instance, in motor boat transmission mechanism. The gear shift mechanism, however, provides a connection between the motor and the transmission clutch, whereby the motor may be operated entirely independent of the transmission clutch, as when warming up the motor, in which case the gear shift mechanism is set at neutral. It will also be understood that when the motor is coupled with the drive shaft 10 of the transmission clutch, the motor may be operated slowly without affecting the driven shaft.

To start the automobile or other vehicle, containing the present transmission clutch, the motor is speeded up somewhat, and by reason of the fact that the driven shaft is motionless, the pistons of the pump mechanism are reciprocated at relatively low speed and liquid is drawn into the cylinder bores and discharged through the restricted orifices, but under gradually increasing pressure, because the liquid cannot freely escape from the cylinders. As the pressure increases in the cylinders, the reciprocating movements of the pistons are retarded more and more, whereby the eccentric strap is caused to rotate bodily with the head 14 around the axis of the shafts, thereby rotating the cam block around said axis and rotating the driven shaft.

As the speed of the driven shaft is accelerated, the weighted arms 47 are thrown outward by centrifugal action and the tapered or inclined face of the flanged disk 45 forces the ball valves 43 upon their seats, thereby entirely closing the restricted ports from the cylinders, preventing the liquid from discharging therefrom, stopping the reciprocatory movements of the pistons, and, in effect, locking the two shafts together through the cam block and strap, so that they rotate in unison. When the motor is slowed up, the restricted discharge orifice will remain closed until the speed of the driven shaft decreases sufficiently to permit the springs 53 to retract the beveled or inclined faces of the flanged disk 45 from the ball valves, thereby permitting the restricted orifices to be opened and allowing the liquid to escape from the cylinders, whereupon the drive shaft will be gradually released from the driven shaft and finally released, when the pistons are entirely free to reciprocate. Whenever the brakes of the automobile are applied and the speed of the driven shaft is rapidly reduced as a result of which the restricted orifices are quickly uncovered, the liquid is permitted to escape from the cylinders and the drive shaft is unclutched from the driven shaft as soon as the motor reaches an idling speed.

I claim:

1. In a transmission clutch, the combination of a drive shaft, a driven shaft, a pump body rigid with one of said shafts and containing cylinder bores, valve controlled inlet and outlet conduits for said cylinder bores, the outlet conduit having a restricted discharge port, pistons reciprocating in said cylinder bores, an eccentric block on the other shaft, and an eccentric strap around said eccentric block connected to said pistons.

2. In a transmission clutch, the combination of a drive shaft, a driven shaft, a pump body rigid with the drive shaft and containing a plurality of radially extending cylinder bores, valve controlled inlet and outlet conduits for said cylinder bores, the outlet conduits having restricted discharge ports, pistons reciprocating in said cylinder bores, an eccentric block on the driven shaft, and an eccentric strap around said eccentric block connected to said pistons.

3. In a transmission clutch, the combination of a drive shaft, a driven shaft in co-axial alignment therewith, a pump body rigid with said drive shaft and containing a plurality of radially extending cylinder bores, valve controlled inlet and outlet conduits leading from a liquid reservoir to said cylinder bores, the outlet conduits having restricted discharge ports, pistons reciprocating in said cylinder bores, an eccentric block on the driven shaft, and an eccentric strap surrounding said eccentric block and operatively connected to said pistons.

4. In a transmission clutch, the combination of a drive shaft, a driven shaft, a pump body rigid with said drive shaft and containing a plurality of radially extending cylinder bores, valve controlled inlet and outlet conduits leading from a reservoir to said cylinder bores, the outlet conduits having restricted discharge ports, pistons reciprocating in said cylinder bores, eccentric mechanism between the driven shaft and said pistons, valves adapted to entirely close said restricted ports, and valve actuating mechanism therefor having centrifugally acting means operated by the driven shaft.

5. In a transmission clutch, the combination of a drive shaft, a driven shaft, a pump body rigid with the drive shaft and having a plurality of radially extending cylinder bores formed therein, valve controlled inlet and outlet conduits opening to said bores from a reservoir, the outlet conduits having restricted discharge orifices, pistons reciprocating in said cylinder bores, an eccentric block upon the driven shaft, an eccentric strap surrounding said eccentric block, and links connecting said eccentric strap with the pistons, and a body of liquid entering said cylinder bores and co-operating with the pistons to bodily rotate the eccentric strap and therewith the eccentric block around the axis of the drive and driven shafts.

6. In a transmission clutch, the combination of a drive shaft, a driven shaft, a pump body rigid with the drive shaft and having radially extending cylinder bores formed therein, valve controlled inlet and outlet conduits leading from said bores, pistons reciprocating in said bores, an eccentric block on the driven shaft, an eccentric strap around the eccentric block and connected to said pistons, ball valves for positively closing said restricted orifices against the discharge of liquid from said ports, a flanged disk having an inclined face engaging said ball valves, centrifugally acting means operated by the driven shaft for moving said disk in a direction to seat said ball valves, and resilient means for urging the disk in the opposite direction.

7. In a transmission clutch, the combination of a drive shaft, a driven shaft in co-axial alignment therewith, liquid pumping mechanism having actuating means, part of which is carried by the drive shaft and part by the driven shaft, said pumping mechanism having valve controlled inlet and outlet conduits, valves for entirely closing said outlet conduits, a disk-like member rotating with said liquid pumping mechanism for seating and permitting said valves to unseat, and means for actuating said disk-like member including centrifugally acting members connected to the driven shaft.

HARRY H. BERRYMAN.